Feb. 7, 1928.

W. F. GREATHEAD ET AL 1,658,436

C CLAMP

Filed May 14, 1923

Inventors.
William F. Greathead
and
Milton J. Tamblyn.
Thurston Kwis & Hudson
attys.

Patented Feb. 7, 1928.

1,658,436

UNITED STATES PATENT OFFICE.

WILLIAM F. GREATHEAD AND MILTON J. TAMBLYN, OF CLEVELAND, OHIO, ASSIGNORS, BY DIRECT AND MESNE ASSIGNMENTS, OF ONE-HALF TO WILLIAM F. GREATHEAD AND ONE-HALF TO JAMES C. DE GARMO, OF CLEVELAND, OHIO.

C CLAMP.

Application filed May 14, 1923. Serial No. 639,025.

The present invention relates to a clamp which is known as a C clamp, the object of the invention being to provide a clamp of the character described, which is made of sheet metal.

Figures 1, 2:
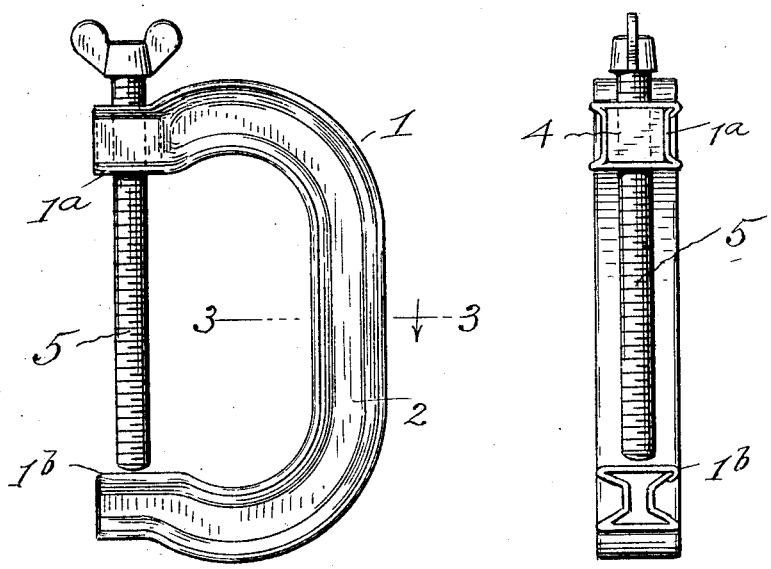
Figure 3:
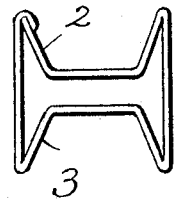

Reference should be had to the accompanying drawings forming a part of this specification, in which Fig. 1 is a side elevation; Fig. 2 is an end elevation; Fig. 3 is a section upon the line 3—3 of Fig. 1.

Referring to the drawings, the body portion which is generally represented at 1 is formed of sheet metal which is of tubular shape and is formed in suitable dies to assume a general C shape. The side members of the body portion are provided with inwardly extending grooved portions such as indicated at 2 and 3, thereby providing what may be termed an I-beam cross-sectional shape for the body of the clamp.

The described form gives the body portion of the clamp rigidity and ability to withstand strains to which the clamp is subjected in use.

One end of the body portion of the clamp is formed with a hollow squared portion such as indicated at 1ª, and this portion is adapted to receive a threaded nut 4. The squared end portion 1ª is provided with oppositely formed openings which are in alignment with the opening in the nut 4, and co-operating with the nut 4 is a threaded rod 5 which extends through the nut 4.

The opposite end of the body portion is formed with a flat part 1ᵇ which acts as an abutment, between which abutment and the end of the screw the work to be clamped may be received.

Having described our invention, we claim:

1. A clamp having a hollow C shaped body formed of a single piece of sheet metal, said body having a cross-sectional shape resembling an I-beam, a threaded member associated with one end of the body portion, and a threaded rod co-operating with said threaded member.

2. A clamp having a hollow C shaped body formed of sheet metal, said body having a cross-sectional shape resembling an I-beam with the flanges thereof extending transversely with respect to the plane of the clamp, one end of said body portion being formed with a recess, a threaded member adapted to occupy said recess, and a threaded rod extending through the opening in the threaded member and through openings in the walls of the said recessed portion of the body.

3. A clamp having a C shaped body formed of a single piece of sheet metal, said body being hollow and having a cross-sectional shape resembling an I-beam and having its flanges at substantially right angles to the web upon the interior and exterior of the C and its web in the plane of the C, a threaded member associated with one end of the C shaped body and a threaded rod co-operating with said threaded member.

In testimony whereof, we hereunto affix our signatures.

WILLIAM F. GREATHEAD.
MILTON J. TAMBLYN.